May 25, 1948.  E. D. GAREHIME  2,442,289
AIRPLANE CONTROL SYSTEM
Filed April 6, 1945  2 Sheets-Sheet 1

INVENTOR.
Ervin D. Garehime
BY
McLaughlin & Wallenstein
Attys.

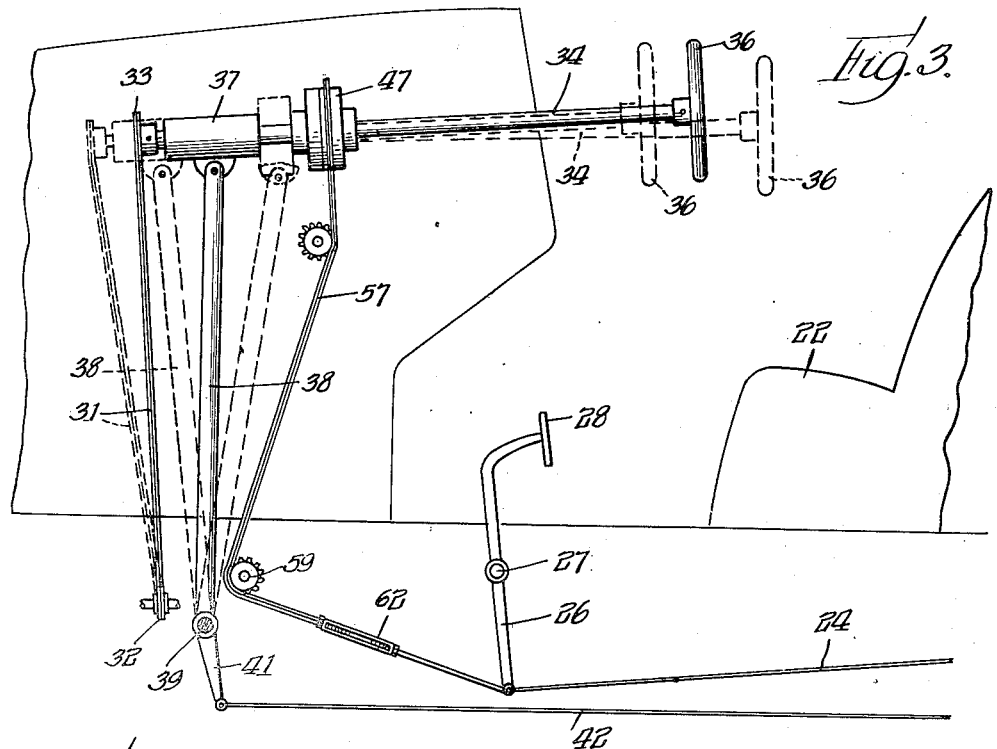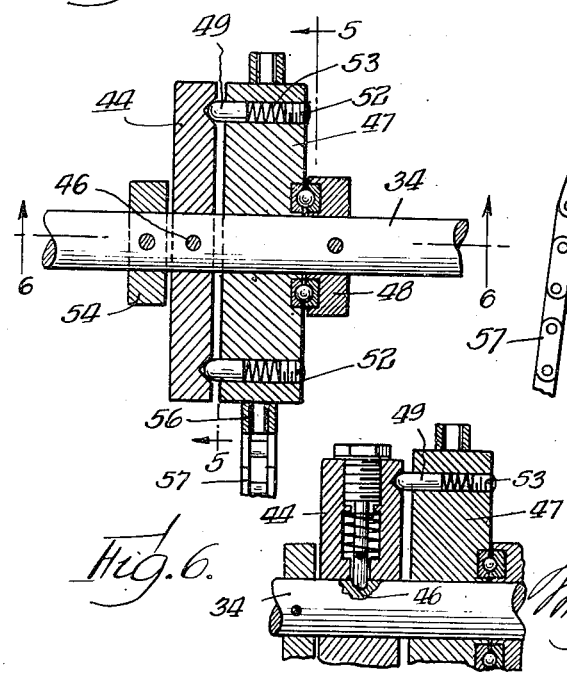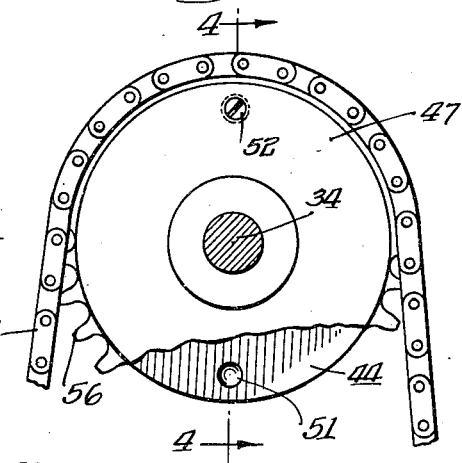

Patented May 25, 1948

2,442,289

UNITED STATES PATENT OFFICE 2,442,289

AIRPLANE CONTROL SYSTEM

Ervin D. Garehime, La Porte, Ind., assignor of one-third to William M. Jackson, and one-third to Edward Young, both of La Porte, Ind.

Application April 6, 1945, Serial No. 586,871

1 Claim. (Cl. 244—83)

My invention relates to heavier than air craft, and more in particular to control systems therefor.

Aircraft of the heavier than air type, conventionally called aeroplanes, are usually controlled in flight by a three element control system comprising ailerons associated with the wings and rudder and elevators associated with the tail. The ailerons rotate the plane about its longitudinal axis, the rudder about its vertical axis and the elevators about its transverse axis. While these three controls may be changed in many respects, and may even occupy positions other than indicated in special types of aircraft, the same or equivalent controls are required to adjust the airplane to various positions while in actual flight.

The controls referred to hereinabove are used in various ways required to be learned by the student and later utilized by the experienced flyer. In conventional flight, the controls are co-ordinated; as, for example, in making a conventional normal turn to the right the aileron control is moved to the right to bank the plane and at the same time pressure is applied to the right rudder. In such a maneuver, the aileron and rudder controls could comprise a single control member. At times, however, as in stunting, for example, in side slipping, the rudder and aileron controls may be moved in reverse position; or they may be moved in the same direction but one to a much greater extent than the other.

The object of my invention is the provision of an improved control system for airplanes.

Another object is to provide a disengageable coordinating relation between the rudder and aileron systems such that they may be operated automatically in coordination on movement of either the rudder or aileron or may be disengaged at will in flight (or at rest) for separate and independent movement.

Other objects and detailed features of the invention will be apparent from the following description showing one embodiment of the invention as applied to an airplane and in part shown in simplified and schematic form to simplify an understanding thereof.

In the drawings—

Fig. 3 is a side elevational view looking from the left hand side of the airplane and indicating the manner in which the controls may be operated, one independently of the other;

Fig. 4 is a fragmentary vertical sectional view through a part of the coordinating mechanism, the section being taken on the line 4—4 of Fig. 5;

Fig. 5 is a sectional view taken on the line 5—5 of Fig. 4 looking in the direction of the arrows; and Fig. 6 is a sectional view taken on the line 6—6 of Fig. 4.

Figure 1:
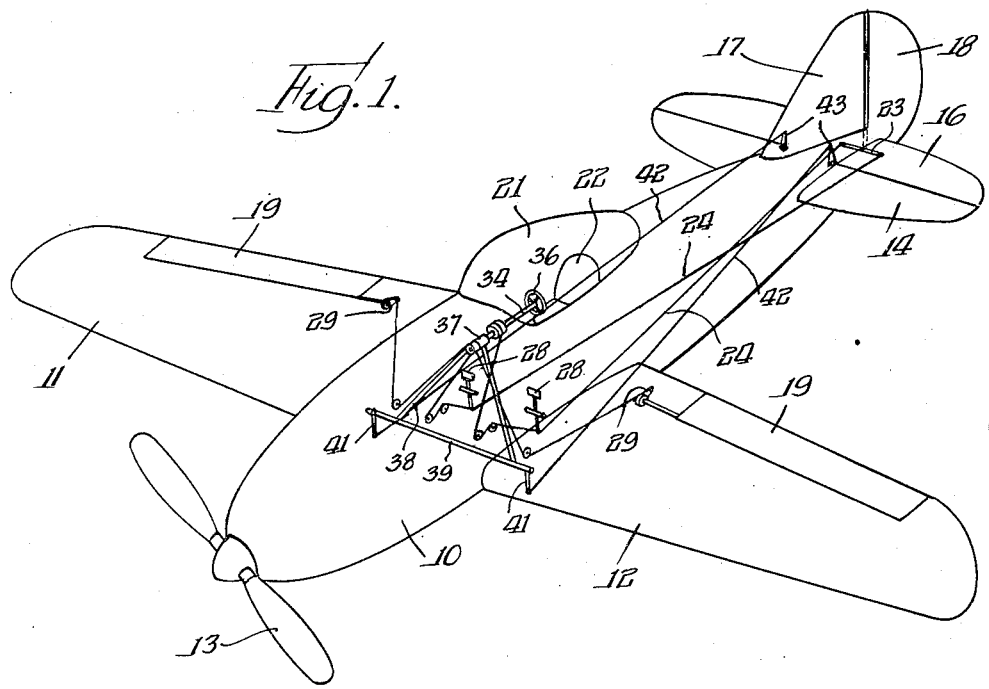
Fig. 1 is a conventionalized perspective showing of an airplane with the usual control surfaces and controlling devices therefor drawn in to simplify an understanding of the relationship of the parts.

Referring now first to Fig. 1, the airplane there shown comprises a fuselage 10 with wings 11 and 12, the airplane being of the tractor type and drawn by a propeller 13 driven by a motor, not shown, housed in the fuselage. The tail comprises a horizontal stabilizer 14, elevator 16 (the design indicates two separate elevator members), a vertical stabilizer 17 and rudder 18. Conventionally, the horizontal stabilizer 14 is adjustable to "trim" the airplane so that any tendency for it to fly nose high or nose low can be corrected. Conventionally, also, the vertical stabilizer 17, or a portion thereof, is also adjustable to assist in compensating for propeller torque. The airplane controls are completed by the provision of ailerons 19 and the provision of a "trim" device (not shown) associated either with the ailerons or separately applied to the wing. The ailerons 19 function in such a way as to rotate the plane about its longitudinal axis, that is to say, when one is lifted to decrease the lift of one wing, the opposite one is lowered to increase the lift of the wing with which it is associated. Those skilled in the art will understand that my invention is not concerned with the construction of the control foils of an airplane per se but these control foils or control surfaces are shown in their proper relation for the purpose of explaining the manner in which the control features of my invention are associated therewith.

The airplane as shown in the drawings has a cowling 21 over a pilot's seat 22. For convenience, I have indicated only a single passenger plane but the plane pictured is intended to be any usual light plane such as used for training or the like and conventionally carrying from two to four passengers. The control system is shown in a position available to the pilot sitting in the seat 22.

Figure 2:
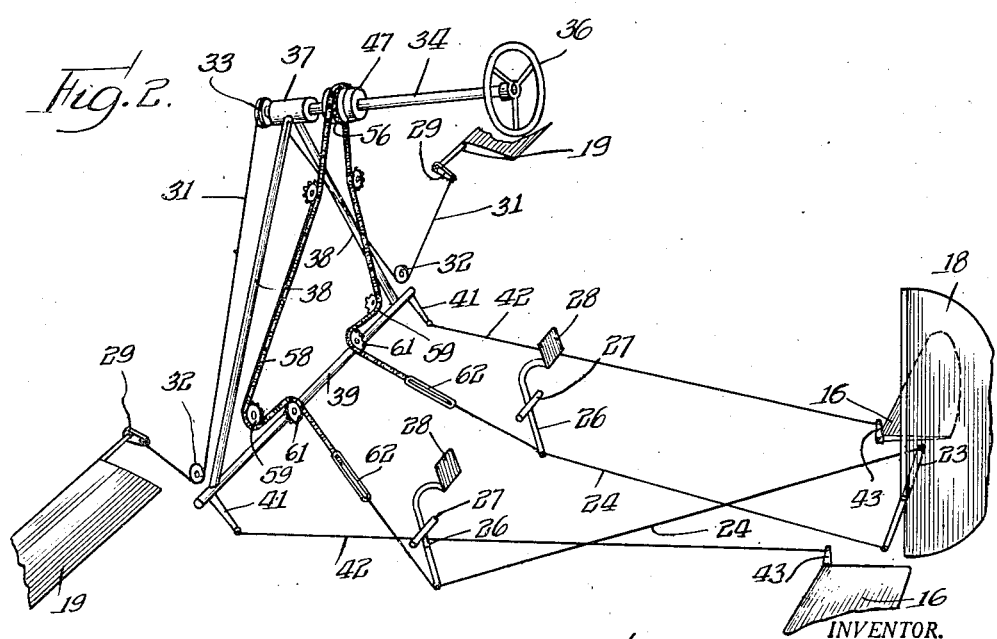
Fig. 2 is an exploded view in perspective and partly schematic showing the control features of my present invention.

Although the controls are also indicated in Fig. 1, reference is made particularly to Figs. 2 to 6, inclusive, for a more complete showing of the relationship of the parts. In Fig. 2, portions of the control surfaces are indicated and the same reference characters are employed as in Fig. 1.

The rudder 18 is provided with a horn 23 to the opposite sides of which are connected control cables 24 leading to the bottom ends of a pair of rudder pedals 26 pivoted at 27 and having foot engaging surfaces 28. Those skilled in the art will understand that many equivalent structures are employed for rudder control such as the usual rudder bar pivoted in the center. The actual operation is the same in any event in that when the left rudder is depressed, the right rudder is moved toward the operator and vice versa.

The ailerons 19 are provided with horns 29 to which are connected the ends of aileron cables 31, trained around pulleys 32 and also around an aileron cable control member 33 secured to shaft 34 and controlled by wheel 36. The connection between the aileron cables 31 and the control member 33 may be of any conventional type such as through a capstan arrangement or sprocket chain and sprocket wheel device or other type of mechanism common to the industry. The rudder and aileron control as so far described are independent of each other and before describing the manner of coordinating them, the elevator control will be described.

The shaft 34 is rotatable in a journalled member 37 forming part of a yoke including uprights 38 and transverse shaft 39 which move as a unit when the wheel 36 is pushed away from or drawn toward the pilot as indicated in Fig. 3. The shaft 39 has a pair of arms 41 leading to elevator cables 42 and these in turn run to horns 43 of the elevators 16. At this point, I wish to note that elevators, as a rule, include top and bottom cables leading to top or bottom arms or horns or equivalent structure so that the exact position of the elevator is at all times under control. Since my present invention is not concerned with the exact manner of operating the control surfaces per se, I have indicated only a single cable 42 and this may be considered as a solid rod for purposes of illustration, if desired, so that either pushing or pulling thereon will have a positioning influence on the elevators.

To coordinate the rudder and aileron controls, I provide a disk 44 secured to shaft 34 by a bolt 46. The lower end of the bolt 46 engages in a depression in the shaft 34 but the bolt 46 may be removed for reasons which will be explained to entirely disengage the disk 44 from the shaft 34. Adjacent disk 44 is a control member 47 normally loose on shaft 34 but held by a thrust bearing 48 in relatively intimate contact with disk 44. Spring pressed plungers 49 are adapted to engage in relatively shallow depressions 51, two in number, on that face of the disk 44 adjacent the control member 47. Thus, so long as the plungers 49 are held in the depressions 51, the control member 47 and disk 44 will rotate with the shaft 34 as a unit; but by manipulation to separate disk 44 and control member 47, in a manner later to be described, the plungers 49 may be caused to ride out of the depressions 51. Spring followers 52 can be adjusted to control the pressure of spring 53 to change the effort required to disengage the plungers 49 from the said depressions 51. To maintain the position of the disk 44 when the bolt 46 is out of engagement with the shaft 34, I provide a ring 54 pinned to the shaft 34. While this ring 54 is not a thrust bearing, it will take some thrust from the springs 53 and should sufficiently maintain the position of the disk 44 to permit ready re-engagement of the bolt 46.

The periphery of the control member 47 is provided with a plurality of teeth 56 adapted to engage between the links of a chain 57, the construction being suitably of an ordinary sprocket gear-sprocket chain type. The chain 57 is connected into a cable system 58 which is trained around pairs of sheaves and pulleys 59 and 61 suitably supported, for example, by the transverse shaft 39. Ends of the cable system 58 are attached to the bottoms of the rudder pedals 26 and suitable tensioning devices 62 are provided to assure a tight link and cable system thereby interconnecting the aileron controls and the rudder controls.

It will be understood that the particular construction shown in the drawings is illustrative and that many other arrangements may be utilized to disengageably coordinate the rudder and the aileron systems in accordance with the features of my invention. In describing the manner in which the invention is used, I shall make reference to specific details of construction, but broadly the manner of operation will illustrate the significant features of the invention as they may be applied to airplane controls generally.

One manner of employing my invention is to teach students proper control of ailerons and rudders in making turns required in normal flying such as taught to a beginner. Assuming the disk 44 is connected to the shaft 34 and a turn is to be made to the right, when the wheel 36 is turned to the right to bank the plane through aileron control thereof, the right hand rudder pedal 26 will also be depressed slightly and show the student the proper manner of coordination of the controls as the turn is made and then coming out of the turn the same coordination takes place and rather firm pressure to "cross" the controls would have to be made in order to prevent proper coordination. The student who has already soloed or the flyer who has not flown for a while and has become rusty could use the device of my invention for teaching or refresher purposes so that he will assure himself proper control coordination. All of this takes place with no effect upon the elevator in any way at all. Any flyer, whether a student who wishes to perform some maneuver not possible with full coordination of aileron and rudder controls, or an instructor to demonstrate a plane movement to the student, may disengage the aileron and rudder control systems by applying slight pressure in the direction in which the controls are to be moved out of coordination. If, for example, the flyer should wish to use the rudder without the ailerons, it would merely be necessary to hold the wheel 36 from turning and press on one of the rudder pedals. If, on the contrary, the airplane were to be banked for a side-slip but without turning, then the wheel 36 could be turned to utilize the aileron controls and the rudder pedals held stationary, or moved in the opposite direction. At any time when the need to re-coordinate the controls again arises, they automatically become re-engaged by moving to a normal position such as in neutral for straight flying, or even a movement into a simple turn. To give another example, an instructor might wish to put an airplane into a spin in such a way as to cross the controls. If the airplane were brought out of the spin in a dive, the ailerons and rudder controls could be brought back to coordinated relation as soon as the plane was brought into a straight dive and before its nose was pulled up for straight flying.

It will be seen, therefore, that I have provided an airplane control system in which there is, in effect, a three element control system capable of being converted to a two element control system or vice versa. An advantage of this type of control system is found in cross country flying. The horizontal stabilizer can be adjusted for level flying, that is to say, so that it is not necessary to operate the elevators to keep the nose from moving upwardly or downwardly. The aileron and rudder being then coordinated, the cross country flyer can either handle the airplane entirely with his feet, leaving his hands free, or entirely with his hands, leaving his feet free. By changing off, a great deal of the tiring monotony of cross country flying without an automatic pilot or like device is avoided.

While the device of my invention can be adjusted in flight, it can also be constructed so as to be entirely disengaged if, for any purpose, this should be desirable, such as when an instructor may be teaching stunt flying or for any other reason. Retracting the bolt 46 restores all of the controls to conventional condition. The same effect could, of course, be obtained by sufficiently loosening the spring followers 52.

I have not indicated materials employed but those skilled in the art will understand that materials may be selected having in mind the characteristics desired at a given point. I prefer that at least that face of the disk 44 which is engaged by the plungers 49 be formed of a suitable metal and also that the plungers 49 be rounded and formed of a relatively hard steel or the like to resist wear. Suitable friction reducing devices may be used throughout, where desired, without affecting the features of my invention. Proper safety devices would be employed wherever necessary.

I have described my invention in considerable detail so that those skilled in the art will understand the same. It will be understood, however, that the invention is not limited to the details as shown and described but the scope thereof is defined in the claim.

What I claim as new and desire to protect by Letters Patent of the United States is:

In an airplane having rudder and aileron controls, a rotatable shaft, an aileron cable control member rotated by said shaft, rudder control mechanism including foot pedals, a rudder control member journalled on the shaft near the aileron control member, connections between the rudder control member and rudder control mechanism such that the control mechanism may be operated by rotation of the said rudder control member, a connection between the aileron control member and rudder control member, whereby the rudder and aileron controls are synchronized, and means to release said last named connection in response to non-synchronous movement of the said controls.

ERVIN D. GAREHIME.

REFERENCES CITED

The following references are of record in the file of this patent:

UNITED STATES PATENTS

| Number | Name | Date |
| --- | --- | --- |
| 1,246,013 | Curtiss et al. | Nov. 6, 1917 |
| 1,355,355 | Phipps | Oct. 12, 1920 |
| 1,424,049 | Thomas | July 25, 1922 |
| 1,432,213 | Sorensen | Oct. 17, 1922 |
| 2,318,833 | Stamback | May 11, 1943 |

FOREIGN PATENTS

| Number | Country | Date |
| --- | --- | --- |
| 323,881 | Germany | Aug. 11, 1920 |

OTHER REFERENCES

Ercoupe Manual, model 415-C, Fig. 9, U. S. Patent Office Library, June 9, 1942.